(12) United States Patent
Chang et al.

(10) Patent No.: US 10,140,195 B2
(45) Date of Patent: Nov. 27, 2018

(54) METHOD, APPARATUS, AND COMPUTER PROGRAM PRODUCT FOR BACKUP AND FAILURE RECOVERY IN A STORAGE DEVICE

(71) Applicant: EMC Corporation, Hopkinton, MA (US)

(72) Inventors: Henry Haihua Chang, Shanghai (CN); Wenrey Wenlei Guo, Shanghai (CN); Chao Chen, Shanghai (CN); Patrick Minggang Lu, Shanghai (CN); Sandro Jiawei Wu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/983,866

(22) Filed: Dec. 30, 2015

(65) Prior Publication Data

US 2016/0196195 A1    Jul. 7, 2016

(30) Foreign Application Priority Data

Jan. 4, 2015   (CN) .......................... 2015 1 0004940

(51) Int. Cl.
*G06F 11/14*    (2006.01)
*G06F 11/20*    (2006.01)

(52) U.S. Cl.
CPC ...... *G06F 11/2094* (2013.01); *G06F 11/1438* (2013.01); *G06F 11/1458* (2013.01);
(Continued)

(58) Field of Classification Search
CPC ............. G06F 11/1446; G06F 11/1458; G06F 11/1471; G06F 11/1469; G06F 9/45533;
(Continued)

(56) References Cited

U.S. PATENT DOCUMENTS 5,088,031 A  *  2/1992  Takasaki ........... G06F 17/30067
                                                      707/E17.005
6,961,941 B1 *  11/2005  Nelson ................ G06F 9/45533
                                                      719/310
(Continued)

FOREIGN PATENT DOCUMENTS

CN          101243447          8/2008
CN          101295278 A       10/2008
(Continued)

*Primary Examiner* — Joseph O Schell
(74) *Attorney, Agent, or Firm* — Krishnendu Gupta; Konrad R. Lee

(57) ABSTRACT

Various embodiments of the present disclosure provide a method, a computer program product and apparatus for failure recovery in a storage device, wherein a storage device comprises at least one server and a storage unit with a plurality of components running on the at least one server, and further comprises backing up, in the storage unit, one or more components in a plurality of components running on the at least one server; monitoring occurrence of a failure on the at least one server and locating one or more components causing the failure; obtaining one or more components that are backed up in the storage unit and correspond to the one or more components causing the failure; and recovering from the failure using the obtained one or more components.

15 Claims, 4 Drawing Sheets

(52) U.S. Cl.
CPC ...... *G06F 11/1469* (2013.01); *G06F 11/1482* (2013.01); *G06F 11/1446* (2013.01); *G06F 11/1451* (2013.01); *G06F 11/1471* (2013.01); *G06F 2201/805* (2013.01)

(58) Field of Classification Search
CPC ............ G06F 9/45541; G06F 9/45545; G06F 9/4555; G06F 9/45558; G06F 9/45562; G06F 9/45575; G06F 9/45583
See application file for complete search history.

(56) References Cited

U.S. PATENT DOCUMENTS

| | | | | |
|---|---|---|---|---|
| 9,152,638 | B1 * | 10/2015 | Naftel | G06F 17/3007 |
| 9,292,327 | B1 * | 3/2016 | von Thenen | G06F 11/1451 |
| 2009/0217024 | A1 * | 8/2009 | Childs | G06F 11/1417 |
| | | | | 713/2 |
| 2010/0070725 | A1 * | 3/2010 | Prahlad | G06F 11/1453 |
| | | | | 711/162 |
| 2010/0162239 | A1 * | 6/2010 | Wires | G06F 17/30067 |
| | | | | 718/1 |
| 2014/0006355 | A1 * | 1/2014 | Kirihata | G06F 17/30233 |
| | | | | 707/654 |
| 2014/0201151 | A1 * | 7/2014 | Kumarasamy | G06F 11/1469 |
| | | | | 707/646 |
| 2015/0066857 | A1 * | 3/2015 | Dayal | G06F 17/30088 |
| | | | | 707/639 |
| 2015/0074536 | A1 * | 3/2015 | Varadharajan | G06F 17/30233 |
| | | | | 715/734 |
| 2015/0347051 | A1 * | 12/2015 | Kruglick | G06F 3/0622 |
| | | | | 711/163 |
| 2016/0127307 | A1 * | 5/2016 | Jain | G06F 3/0619 |
| | | | | 709/245 |

FOREIGN PATENT DOCUMENTS

| | | |
|---|---|---|
| CN | 103516736 | 1/2014 |
| CN | 103559101 A | 2/2014 |
| CN | 1035559101 A | 2/2014 |

\* cited by examiner

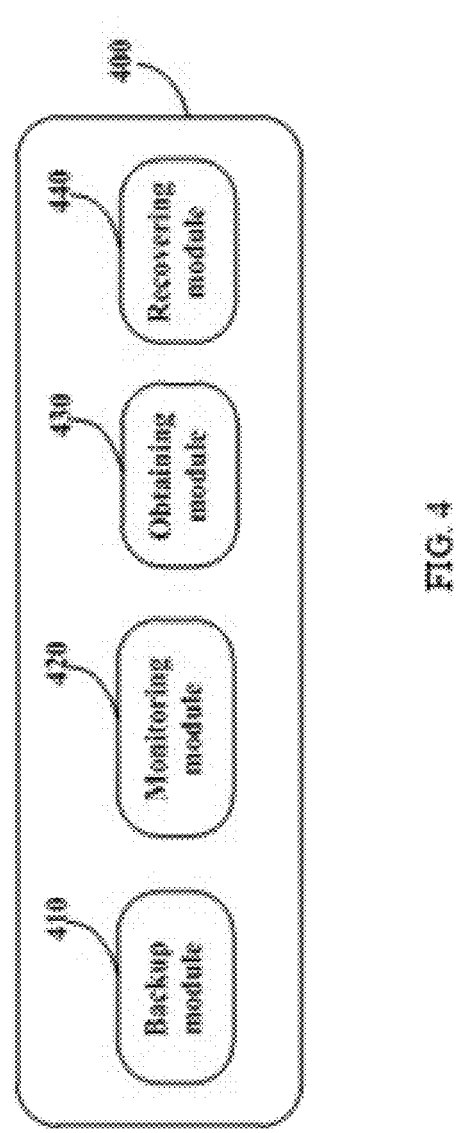

METHOD, APPARATUS, AND COMPUTER PROGRAM PRODUCT FOR BACKUP AND FAILURE RECOVERY IN A STORAGE DEVICE

RELATED APPLICATION

This application claim priority from Chinese Patent Application Number CN201510004940.2 filed on Jan. 4, 2015 at the State Intellectual Property Office, China, titled "METHOD AND APPARATUS FOR FAILURE RECOVERY IN A STORAGE DEVICE," the contents of which is herein incorporated by reference in entirety.

TECHNICAL FIELD

Various embodiments of the present disclosure generally relate to the field of storage.

BACKGROUND

Generally storage devices, particularly those functioning as storage servers, may not support backup and recovery of control path data. For example, for some existing storage devices in the market, such as middle-end and high-end storage devices, no backup may exist for parts of different functions, such as configuration of an operating system kernel, software, and a system running on a storage processor SP/controller server CS/data mobile server DM, and running state related data, etc. Therefore, in the case of software unavailability or system panic caused by a configuration change or software upgrade or in the case of system panic caused by other reasons, e.g. in the following scenarios where: (1) a user may perform a non-destructive upgrade (NDU) to software using software information latest released by a storage device provider, wherein a change in the driver and software during the NDU may result in system panic or unavailability of some software or cause the system unable to be re-started; (2) a user re-configures some software, thereby resulting in system panic or software unavailability; (3) with elapse of time, errors accumulated by the system itself cause system panic; if a user cannot solve a problem encountered through re-starting a storage device and can only seek help from the storage device provider, in these cases, it may unnecessarily waste time, and moreover since the system cannot recover in a timely manner, a significant economic loss may be incurred. it may also result in waste of time for technical support personnel or engineers of the storage device provider.

SUMMARY

Exemplary embodiments of the present disclosure at least provide a method, a computer program product and apparatus for automatically recovering a system or software to operate normally in the case that a failure occurs in a storage device or a storage server. wherein the method may include backing up, in the storage unit, one or more components in a plurality of components running on the at least one server, and monitoring occurrence of a failure on at least one server, and locating one or more components causing the failure. The method further comprises obtaining one or more components that are backed up in the storage unit and correspond to the one or more components causing the failure, and recovering from the failure using the obtained one or more components.

BRIEF DESCRIPTION OF THE DRAWINGS

The features, advantages and other aspects of respective embodiments of the present invention will become more apparent by making references to the following detailed description in conjunction with the accompanying drawings. Several embodiments of the present invention are illustrated here in an exemplary rather than restrictive manner. In the accompanying drawings, the same or similar reference numerals refer to the same or similar elements, in which:

FIG. 4 shows a schematic structural diagram of an exemplary apparatus 400 for failure recovery in a storage device according to embodiments of the present disclosure.

DETAILED DESCRIPTION

Hereinafter, respective exemplary embodiments of the present disclosure will be described in detail with reference to the accompanying drawings. It should be appreciated that these exemplary embodiments are provided merely for those skilled in the art to better understand and practice the present invention, but not intended to limit the scope of the present disclosure in any manner.

Herein, references to "one embodiment," "another embodiment," or "one preferred embodiment," etc. indicate that the embodiment as described may comprise specific features, structures or characteristics, while each embodiment does not necessarily comprise the specific features, structures or characteristics. Moreover, these terms do not necessarily refer to the same embodiment.

It should be further understood that various terms used herein are only for the purpose of describing a specific embodiment, not intended to limit the present invention. For example, the singular form "a" and "the" used herein may comprise a plural form, unless otherwise indicated explicitly in the context. It should also be understood that the terms "comprise," "have" and "include" used herein indicate existence of the features, units and/or components, etc., but do not exclude existence of one or more other features, units, components and/or combinations thereof. For example, the term "more" used herein indicates "two or more". For example, the term "and/or" used herein may comprise any and all combinations of one or more of the associated listed items. Unless otherwise defined, various terms used herein have a general meaning understood by those skilled in the art of the present disclosure.

Exemplary embodiments of the present disclosure provide a method, a computer program product and apparatus for automatically recovering a system or software to operate normally in the case that a failure occurs in a storage device or a storage server. In one embodiment the method may include backing up, in a storage unit, one or more components in a plurality of components running on at least one server. A further embodiment may include monitoring occurrence of a failure on at least one server. A further embodiment may include locating one or more components causing a failure. A further embodiment may include obtaining one or more components that may be backed up in the storage unit and correspond to one or more components that may be causing a failure. A further embodiment may include recovering from a failure using an obtained one or more components.

Figure 1:
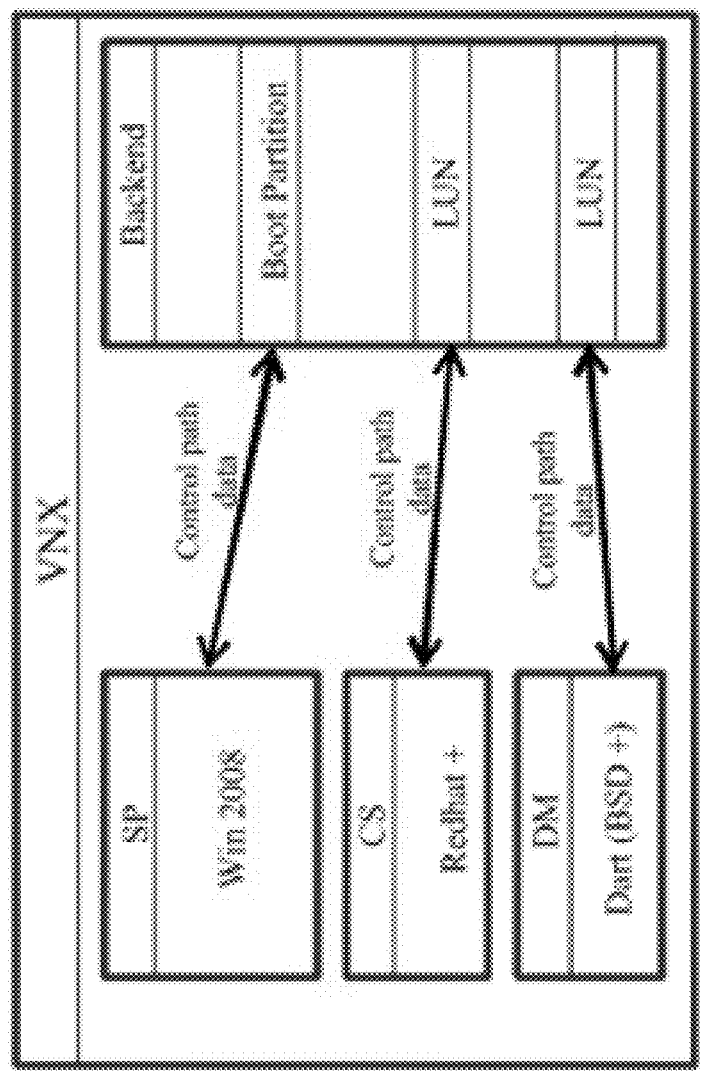
FIG. 1 shows a block diagram of high-layer architecture of an existing EMC VNX-series storage device.

In one embodiment there is provided an apparatus for failure recovery in a storage device. A further embodiment may include at least one server and a storage unit with a plurality of components running on at least one server. A further embodiment of the apparatus may include a backup module, a monitoring module, an obtaining module, and a recovering module. A further embodiment may include a backup module that may be configured to back up, in a storage unit, one or more components in a plurality of components running on at least one server. A further embodiment may include a monitoring module that may be configured to monitor occurrence of a failure on the at least one server, and to locate one or more components causing a failure. A further embodiment may include an obtaining module that may be configured to obtain one or more components that may be backed up in a storage unit and correspond to the one or more components causing a failure. A further embodiment may include a recovering module that may be configured to recover from a failure using an obtained one or more components. In order to illustrate various embodiments of the present disclosure more clearly, a brief introduction will be first made to a main architecture and operation manner of an existing typical middle-end storage device with reference to FIG. 1. FIG. 1 shows a block diagram of high-layer architecture of an existing EMC VNX-series storage device.

The VNX storage device as shown in FIG. 1 comprises a plurality of servers and a backend storage unit. The plurality of servers may comprise: a storage processor server SP on which services such as RAID/DEDUP/CACHE are running, a data mobile server DM, and a controller server CS for monitoring and configuring the data mobile server. The backend storage unit may comprise a plurality of storage disks that provide physical storage space or physical storage areas for various data used during the operation of the storage device, which physical storage areas may be mapped as a plurality of logical units LUN. Specifically, as shown in FIG. 1, the backend storage unit of the VNX storage device includes a "boot partition" and a plurality of common logical units LUN.

SP in VNX series storage device may run different Windows® operating systems and built-in software owned by the storage device provider. SP stores its relevant control path data into the "boot partition" of the backend storage unit and obtains these control path data therefrom. The "control path data" used herein refer to a plurality of components running on respective servers of the storage device. These components enable the server and the software running thereon to operate normally, which may include, but not limited to: an operating system kernel running on the server, a driver(s), a software configuration file(s) (including configuration and running state information of the software), a software binary file(s) and firmware. Specifically, the control path data associated with SP includes a plurality of components running on SP, so that SP and the software running thereon can operate normally. In addition, the control path data associated with certain software include a plurality of components associated with the operation of the software, so that the software can operate normally.

CS in VNX-series storage device may run a RedHat+ Linux® operating system and built-in software owned by the storage device provider. CS may have its own storage disk, but it will also store a copy of the control path data associated therewith in some storage logical units LUN at the backend, and it may also be synchronized periodically.

DM in VNX-series storage device is used for converting a file-level request of a user to a block-level request, transferring it to SP, and moving user data so as to respond to the user request. DM runs data access in real time (Dart), which may be a modified Berkeley Software Distribution (BSD) Linux®, and built-in software owned by the storage device provider. DM does not have its own storage disk; instead, it stores the control path data associated therewith in a LUN at the backend, and obtains these data from the LUN.

Dependent on differences in the operating systems and built-in software run by SP, VNX storage device may be divided into different series, e.g., VNX1 and VNX2, wherein SP of VNX1-series storage device may run the Microsoft Windows® 2008 operating system; while VNX2-series storage device may run Microsoft Windows® 2008 R2 SP1. Besides, comparing with VNX1, CS in VNX2-series runs the built-in software of an updated version and DM runs Dart having many code modifications, etc.

It may be seen from FIG. 1 that in the existing storage device, control path data associated with respective servers, e.g., executable files of the operating system and software, as well as configuration data, are all stored at backend. They will be directly or indirectly loaded from the backend and then executed. Although the above analysis of a storage device is only based on a product of the existing storage device provider, products of other storage device providers also have a same or similar architecture and operating manner. An issue of the current architecture lies in that in the case of a software failure or system panic, it cannot be recovered quickly, because in the storage device, there is only one copy of the control path data associated therewith for respective servers, e.g., for the operating system or software on the server, there is only one copy of executable binary files and one copy of configuration files.

Various exemplary embodiments according to the present disclosure provide a mechanism, which may periodically back up control path data associated with respective servers from the backend, e.g., software binary files, configuration files, and running state-related data, or perform such backup before a significant event, such as a NDU or configuration change by a user, and then recover using a backup where necessary, such that a user may possibly quickly recover the software or system to run normally when a user encounters a software or system failure, e.g., system panic, without any issues to seek help from technical personnel of the device provider. According to the embodiments of the present disclosure, in order to avoid an unnecessary burden to a backend storage unit, it may not be required to back up all control path data or components running on the server. In a further embodiment, preferably, a control path data or components that need to be backed up may comprise: an operating system kernel, a driver(s), a software configuration file(s), firmware, and a software binary file(s) that may be changed. In an example embodiment, for a server installed with the Windows operating system, it may not be required to back up files, such as notepad.exe, that belong to Windows applications.

Hereinafter, a method and apparatus for failure recovery in a storage device according to embodiments of the present disclosure will be specifically described with reference to the accompanying drawings. In order to facilitate understanding of the failure recovery method according to the embodiments of the present disclosure, a component retrieving method according to an embodiment of the present disclosure will be introduced first.

The storage device according to embodiments of the present disclosure comprises at least one server and a storage unit. In a further embodiment, during a process of installing an operating system and software on the server, a plurality of storage logical units LUN may be established in the storage unit and these LUNs may be numbered or indexed. In a further embodiment, for example, these LUNs may be labeled as L1, L2, L3, LN, wherein N is a unique serial number or index. In a further embodiment during a process of backing up components (preferably, a plurality of components associated with the operating system and software may be backed up when the operating system and software are first installed), a unique number may be assigned to the component to be backed up. In a further embodiment, based on this number, the component may be stored in a storage logical unit having the same number, or a logical unit may be directly assigned to a component to be backed up for storage, such that each backed up component may correspond to a storage logical unit number (or index). In a further embodiment, for example, if a configuration file of a software "Autoconfig" is assigned with a unique number 2, then a LUN numbered L2 may be used for storing a configuration file of a "Autoconfig"; alternatively, a logical unit may be directly assigned to a configuration file for storing it.

According to embodiments of the present disclosure, a table may be maintained in a memory of a storage device. In a further embodiment, a table may also be referred to as "a logical unit search table" or "a LUN search table" infra. In a further embodiment, in this table, a name of a backed up component, a corresponding logical unit number (or index), and an initial address (e.g., an initial logical block address (LBA)) of a physical storage area in which a component may actually be backed up may be stored in association. In a further embodiment, the table may also store a description about the component in association with the backed up component. Table 1 provides a specific example of a LUN search table according to an embodiment of the present disclosure.

TABLE 1

LUN Search Table

| LUN number (or index) | Component name | Description | Initial LBA of storage |
|---|---|---|---|
| 1 | autoconfig.exe | Binary file of autoconfig | 0x9966 |
| 2 | autoconfig.cfg | Configuration file of autoconfig | 0xA002 |
| . . . | . . . | . . . | . . . |
| 0x39 | clariion_cfg.sys | Binary file of clariion_cfg | 0xA518 |
| 0x3A | clariion_cfg.inf | Configuration file of clariion_cfg | 0xA582 |
| 0x3B | clariion_mgmt | Zip file of clariion_mgmt | 0xA598 |
| . . . | . . . | . . . | . . . |

In one embodiment, a logical unit search table may be preferably maintained in a non-volatile memory (NVRam). In a further embodiment, an advantage of using NVRam lies in that it is non-volatile, but may still be accessed like a memory (e.g., DRAM). In a further embodiment, NVRam may be constructed through DRAM/SRAM having its own battery.

According to one embodiment of the present disclosure, when one or more components of an operating system or software running on a server fail, a backup location of a failed component may be directly searched in a logical unit search table, and then a backed up component may be obtained from a backup location to replace the failed component, such that a failed component may be recovered from the failure.

According to a preferred embodiment of the present disclosure, in order to retrieve a backup location of a failed component or a failure-incurring component more quickly, backup components may be divided into several groups based on common features of the backed up components, where each group may be identified by a symbol or a character. In a further embodiment, another table may be maintained in a memory, which table may be referred to as an "index search table" infra. In a further embodiment, in this table, a symbol or character identifying each group may be stored in association with an indication of a range of a logical unit in which the components included in this group may be backed up, e.g., an initial index of a logical unit and/or an end index of a logical unit.

In a further embodiment, these components may be grouped preferably based on initial letters of names of the components to be backed up, such that a symbol or character identifying each group may be the initial letter of the names of the components included in that group. In a further embodiment, the index search table may be preferably maintained in a NVRam. In a further embodiment, alternatively, these components may also be grouped based on letters or characters at another position of the names of the components to be backed up. In a further embodiment, if there is no corresponding letter or symbol at the position, it may be allocated into a special group, and the group may be identified with a special and unique symbol or character. The scope of the present disclosure is not limited by any specific grouping manner or identifying manner.

Table 2 provides a specific example of an index search table according to an embodiment of the present disclosure. In Table 2, the initial letters of the component names, e.g., the initial letters of software names or configuration file names are arranged alphabetically and mapped to the initial LUN index. Correspondingly, the backed up components are also arranged according to the corresponding alphabetical order in the logical unit search table, as shown in Table 1.

TABLE 2

Index Search Table

| Initial letter of component name | Initial LUN index |
|---|---|
| A | 0x1 |
| B | 0x18 |
| C | 0x39 |
| D | 0x5A |
| . . . | . . . |
| Z | 0x178 |
| Z + 1 | 0x18A |

According to one example embodiment of the present disclosure, when one or more components of an operating system or software running on a server cause a failure, a symbol or character identifying a group in which a component causing the failure is included may be first determined, and then a range of a logical unit corresponding to the group is retrieved in an index search table based on the symbol or character, e.g., an initial logical unit index. In a further embodiment, subsequently, a name of a component causing a failure may be searched in a logical unit search table only within a retrieved range of a logical unit.

In a further embodiment, both an initial index and an end index of a logical unit in which the backed up components in a group are backed up may be stored in association with the group of the backed up components in an index search table. In a further embodiment, dividing groups based on an initial letters of component names, for example, as shown in Table 2, and an end index of a logical unit corresponding to a group may be indicated by an initial index of a logical unit of a group immediately next thereto.

In a further embodiment, a "Z+1" may be provided at an end of a column "initial letter of component name" in Table 2, which may indicate an end index of a logical unit corresponding to a group including components with an initial letter "Z" and may be used for limiting a search boundary for searching the components with an initial letter "Z". In a further embodiment, a search boundary may also be limited by other symbols or characters, and the present disclosure is not limited by any specific limitation manner. In a further embodiment, based on the above logical unit search table and index search table, a desired component backup may be quickly retrieved when recovering the component causing the failure.

Figure 2:
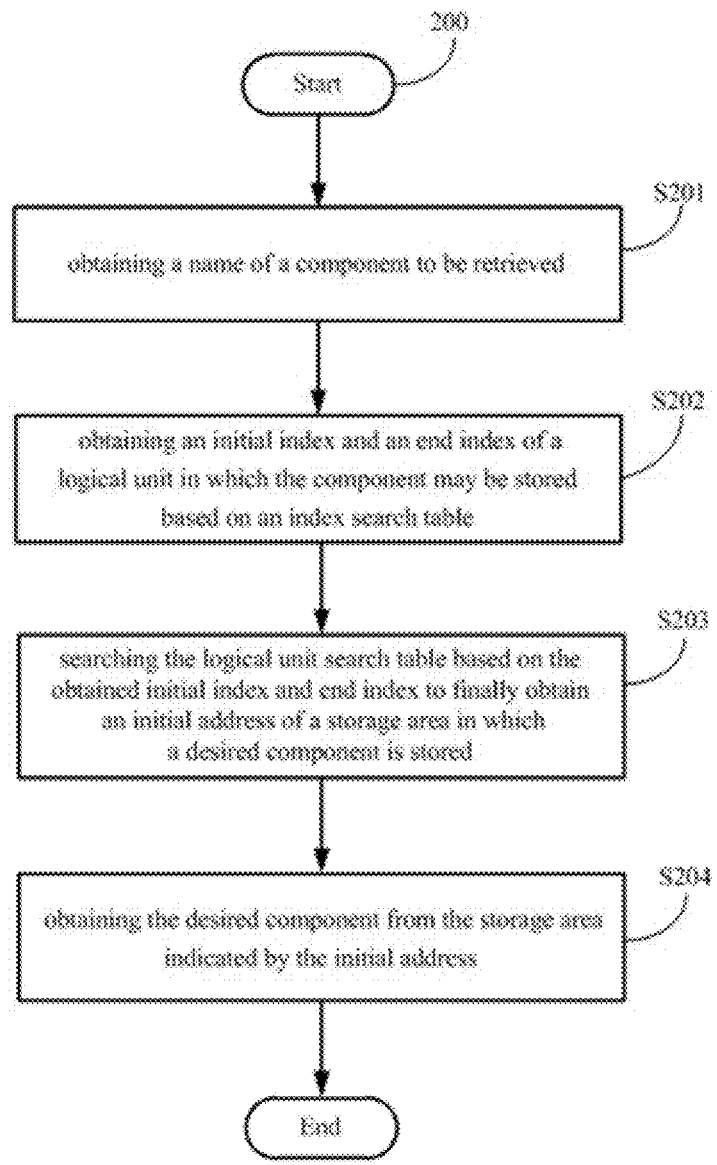
FIG. 2 schematically shows a flowchart of an exemplary retrieving method 200 for obtaining a desired component backup based on a logical unit search table and an index search table according to embodiments of the present disclosure.

FIG. 2 schematically shows a flowchart of an exemplary retrieving method 200 for obtaining a desired component backup based on a logical unit search table and an index search table according to embodiments of the present disclosure.

In the method, first a name of a component to be retrieved is obtained in step S201; then, in step S202, an initial index and an end index of a logical unit in which the component is potentially backed up are obtained through searching an "index search table"; in step S203, the "logical unit search table" is searched based on the obtained initial index and end index to finally obtain an initial address of a storage area in which the desired component is backed up; and in step S204, the backup of the desired component is obtained from the storage area indicated by the initial address.

In one embodiment, pseudo code of an exemplary algorithm for implementing a retrieving method as described with reference to FIG. 2 is illustrated below. In a further embodiment, a pseudo code may be provided only for a purpose of facilitating understanding of the present disclosure, and not intended to limit the scope of the present disclosure in any manner.

```
CODE - START
GetBoundary:
#input: filename
#output: boundary for index in "LUN Search Table" - startindex, endindex
    Get start letter of filename: 1=filename[0]
    startindex=(base of "LUN Search Table" + [1 -
26])->Start_LUN_Index
    endindex=(base of "LUN Search Table" + [1 -
26+1])->Start_LUN_Index
    return startindex, endindex
SearchLUNTable:
#input: filename
#output: LBA of backend LUN where file 'filename' exists
    rename "LUN Search Table" as LST
    startindex, endindex=GetBoundary(filename)
    foreach item in (LST[startindex]...LST[endindex])
    do
        if item->File_Name==filename: return item->Start_LBA
    done
    return None
CODE - END
```

In a further embodiment, through a specific example it would be illustrated how to quickly obtain a backup of a component that may need to be recovered, e.g., software binary file "clariion_mgmt.exe", based on a logical unit search table and an index search table, e.g., Table 1 and Table 2.

In a further embodiment, first, an initial letter "c" of a file name "clariion_mgmt.exe" may be used to search Table 2 "index search table," such that an initial LUN index 0x39 and an end LUN index 0x5A that likely store a file may be obtained. In a further embodiment, the two indexes may be used, in the "LUN search table", as an initial LUN boundary and an end LUN boundary within which a component with the initial letter "c" in its name is likely backed up.

In a further embodiment, in Table 1 "LUN search table", it may be checked whether "clariion_mamt.exe" exists in the corresponding "component name" column starting from 0x39. In a further embodiment, in case of existence, an initial address of a storage area storing that component may be obtained from a corresponding "initial address of storage" column and a component may be obtained therefrom; otherwise, the method proceeds to the next entry, i.e., attempting the same operation on 0x3A (=0x39+1). In a further embodiment, if a desired component cannot be found yet, the same operation may be attempted on 0x3B(=0x3A+1) entry, so on and so forth, till finding the desired component or reaching the search boundary, i.e., 0x5A entry. In a further embodiment, if a desired file is not found till a boundary, it may signify that this might be a newly installed component, which has not been backed up yet.

In a further embodiment, the total number of components that need to be backed up on a server in a storage device may usually be less than 500; therefore a size of the LUN search table may be set to less than 500. In a further embodiment, if an index search table may be established based on an initial letter of a component, then an average time for searching a component may be less than the time of searching 500/26≈20 components, wherein 26 denotes the total number of English letters. In a further embodiment, searching efficiency may be effectively enhanced by utilizing a component searching algorithm according to the embodiments of the present disclosure. In a further embodiment, a LUN search table and an index search table may be updated during a system or software upgrade procedure or updated each time when a component associated with the system or software is backed up.

According to other embodiments of the present disclosure, in each LUN in which a component is backed up, there may exist different versions of the component. In a further embodiment, these different versions may be distinguished by attaching a timestamp after their names. In a further embodiment, for example, in LUN L1, there may exist two versions "Autoconfig.exe.20130121" and "Autoconfig.exe.20140101" of the file "Autoconfig.exe." In a further embodiment, generating times of different versions of the component may be clearly known. In a further embodiment, when recovering a failed component, a component having a latest timestamp may be selected for failure recovery.

In one embodiment, details on how to monitor occurrence of a failure during system startup and running so as to find a component causing the failure will be discussed. According to embodiments of the present disclosure, a monitor may be set in a uniform extensible firmware interface (UEFI) basic input output system (BIOS) of a storage device and an operating system kernel, respectively. In a further embodiment, in a UEFI BIOS, a monitor may be a UEFI application or a UEFI service, while in an operating system kernel a monitor may be a kernel thread. In a further embodiment, a monitor may be used for monitoring a start and running of a software/system on a server so as to find occurrence of a failure on the server and find a component that may be causing a failure. In a further embodiment, monitoring of a failure by a monitor may include the following circumstances:

(1) During a starting process of a system, a monitor in a UEFI BIOS implements a failure monitoring function. In an embodiment, if, during a system starting process, for example, a system cannot be started or may be started abnormally because a UEFI BIOS has loaded some firmware that cannot work normally, i.e., a failure occurs, then the monitor may detect a failure and find a component causing the failure from among relevant components of the loaded firmware.

In a further embodiment, a count for continuous starting times of a system may be stored by maintaining a counter in a NVRam, with a count threshold being set. In a further embodiment, when a system enters into a normal state within a count threshold, no other operation may be required; otherwise, a failure recovery operation according to the embodiments of the present disclosure may be required. In a further embodiment, for example, a threshold for a start counter may be set to 3. In a further embodiment, if an operating system is restarted to a normal state within three times from a first start or from a panic state, no other operation may be required. In a further embodiment, alternatively, if an operating system cannot be restarted to a normal state within three times from a first start or from a panic state, then a failure recovery operation according to the embodiments of the present disclosure may be initiated. In a further embodiment, a counter may be accessed by an application monitor in a UEFI BUIS and an OS kernel. In a further embodiment, during a starting process, a monitor in a UEFI BIOS attempts to increment the counter by 1 after each restart, and after a system is started normally, the OS monitor may set the counter to 0.

(2) During running of a system, a monitor in an OS kernel implements a failure monitoring function. In an embodiment, while a system is running, if some software cannot be started or cannot work normally, i.e., a failure occurs, the failure may be caused by a change of configuration or NDU; then a monitor in the OS kernel may detect a failure, and find a component causing the failure among the components related to a software, e.g., a certain executable binary file. In a further embodiment, this software failure may be recovered through system restarting. In a further embodiment, after a system enters a restart process, an operation of a failure monitoring is identical to that described above in (1).

(3) In case of system panic, system restarting may be tried. In an embodiment, a monitor in a UEFI BIOS may implement a failure monitoring function so as to find a component associated with the failure. In a further embodiment, after a system enters a restart process, the operation of a failure monitoring is identical to that described above in (1).

In one embodiment, after a system or software failure is monitored and a component causing the failure is found, the component retrieving method 200 as described with reference to FIG. 2 may be invoked with the component causing the failure as the component to be detected, so as to obtain a desired component backup in a storage unit, and then running of the component may be attempted again with a desired component backup instead of a component that may be causing a failure, thereby completing a failure recovery process.

In one embodiment, in order to effectively implement failure recovery of a storage device, it may be needed to timely and effectively back up various components running on a storage server. According to different embodiments of the present disclosure, the backup may include at least one of the following circumstances:

(1) periodical backup: various components running on a server, e.g., software binary files, configuration files, software current running state-related data, and the like may be backed up periodically. In one embodiment, the entire software package may be scanned to compare components therein with the components backed up in a storage unit. In a further embodiment, in the case of a difference, a new component may be stored, with its timestamp being updated. In a further embodiment, relevant information of such component may be added to a "LUN search table" and "index search table." In a further embodiment, during installation of a system or software, relevant components of a system or software may be backed up.

(2) Backup before occurrence of NDU: as mentioned previously, NDU upgrades software running on a server. In one embodiment, during NDU, not all software may be upgraded. In a further embodiment, it may be required to check the NDU software package so as to learn which software may be upgraded. In a further embodiment, components related to a software to be upgraded, e.g., an executable binary file or a configuration file may be changed. In a further embodiment, for a component to be changed, a LUN search table may be first searched so as to obtain a backup position of an old version of that component in a storage unit, e.g., a LUN serial number Lz, and then a new version of that component may be stored in the LUN Lz; besides, relevant information of the new version of that component may be correspondingly added into the LUN search table. In a further embodiment, the NDU, software of a new version may be installed and run. In a further embodiment, if a software cannot be started or cannot be run normally, a component causing a failure may be found through failure monitoring by a monitor, and a desired component backup may be obtained through the above component retrieving method 200. In a further embodiment, in case of NDU, a desired component backup may be a component of an old version saved in the LUN Lz, and then normal running may be recovered with a backup component instead of a component causing a failure. In a further embodiment, if new software exists in the NDU software package, a new LUN may be assigned to the new software, and then a relevant component of the software is backed up into the LUN; besides, relevant information of such component is added to the "LUN search table" and "index search table."

(3) Backup before the user changes software configuration: during an input period when a user confirms his/her change of configuration, a LUN search table may be first searched so as to obtain a location of an original configuration file on the storage unit, e.g., LUN number Lp, and then the new configuration file may be saved in the LUN Lp; besides, information regarding the new configuration file may be added to the "LUN search table" and "index search table." In one embodiment, if the software cannot be started or cannot work normally after a configuration change, a component causing a failure may be found through a failure monitoring by a monitor, and a desired component backup may be obtained through the above component retrieving method 200. In a further embodiment, in case the configuration is changed, a desired component backup may be an old configuration file likewise saved in a LUN Lp, and then normal operation may be recovered with an old configuration file instead of a new configuration file.

Figure 3:
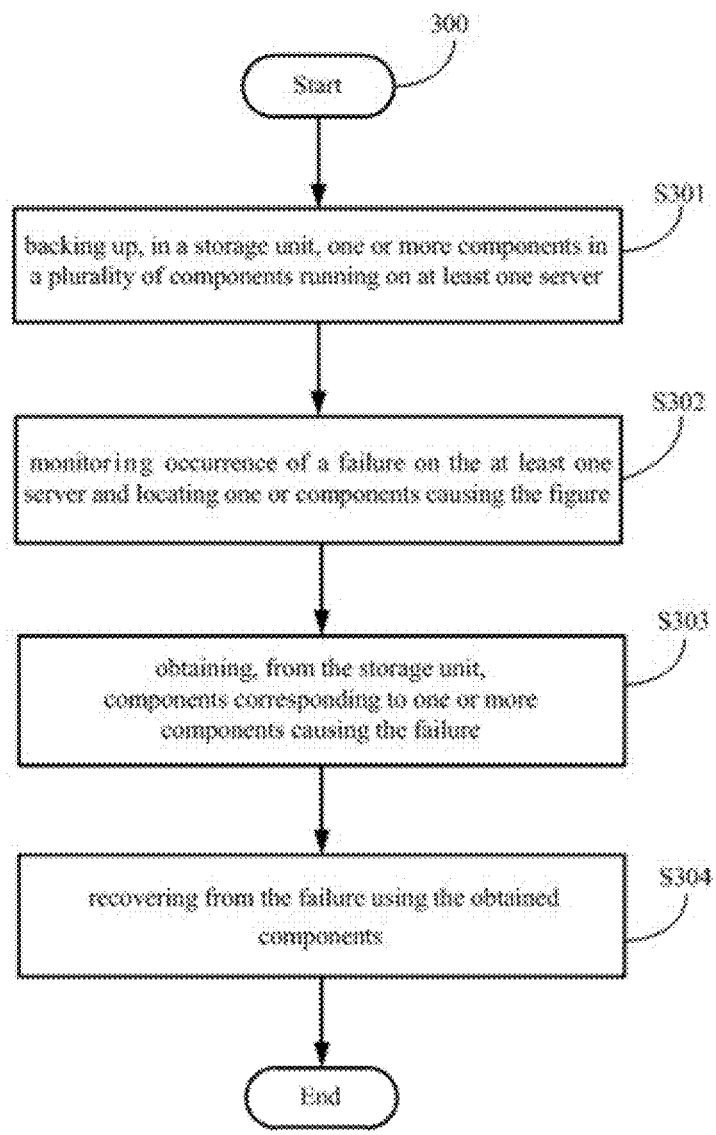
FIG. 3 schematically shows a flowchart of an exemplary method 300 for failure recovery in a storage device according to embodiments of the present disclosure.

FIG. 3 schematically illustrates a flowchart of method 300 for failure recovery in a storage device according to embodiments of the present disclosure. In one embodiment, a storage device comprises at least one server and a storage unit with a plurality of components running on at least one server. In a further embodiment, a plurality of components may comprise one or more of the following: an operating system kernel running on the server, a driver, a software configuration file, a changeable software binary file, and firmware.

Reference is made to FIG. 3, in method 300, in step S301, one or more components in a plurality of components running on the at least one server are backed up in the storage unit. Next, in step S302, occurrence of a failure on the at least one server is monitored, and one or more components causing the failure are located. Next, in step S303, one or more components corresponding to the one or more components causing the failure are obtained from the storage unit. Finally, in step S304, the failure is recovered using the obtained one or more components In one embodiment, a backup operation may be performed periodically. In another embodiment, a backup operation may be performed, before at least one component in a plurality of components may be upgraded, for the at least one component. In a further embodiment, a backup operation may be performed, before configuration of at least one component of a plurality of components may be changed, for a configuration of at least one component.

In one embodiment, a method of monitoring by a monitor and locating a component causing a failure according to the embodiments of the present disclosure has been described above in detail, and will not be detailed here for the sake of brevity. In a further embodiment, retrieving method 200 for obtaining a desired component from a storage unit according to the embodiments of the present disclosure has been described above in detail with reference to FIG. 2, which will not be detailed here for the sake of brevity. In a further embodiment, for example, if NDU results in a case where software cannot operate normally or cannot be started, the software may be run again with a component obtained instead of a component causing a failure.

FIG. 4 shows a schematic structural diagram of apparatus 400 for failure recovery in a storage device according to embodiments of the present disclosure. A storage device comprises at least one server and a storage unit with a plurality of components running on the at least one server. As shown in FIG. 4, apparatus 400 comprises backup module 410, monitoring module 420, obtaining module 430, and recovering module 440. Backup module 410 is configured to back up, in a storage unit, one or more components in a plurality of components running on the at least one server. Monitoring module 420 is configured to monitor occurrence of a failure on at least one server, and to locate one or more components causing a failure. Obtaining module 430 is configured to obtain one or more components that are backed up in a storage unit and correspond to the one or more components causing a failure. Recovering module 440 is configured to recover from a failure using an obtained one or more components.

In one embodiment, apparatus 400 may further comprise a logical unit establishing module that may be configured to establish a plurality of logical units in a storage unit, wherein each logical unit may include a storage area having a certain address range, and each component as backed up may be stored in a corresponding logical unit. Apparatus 400 may further comprise a search table maintaining module configured to maintain a logical unit search table, wherein a name of each component in a plurality of components, an index of a logical unit in which a component is backed up, and an initial address of a storage area on which a component is backed up may be stored in association. In a further embodiment, a search table maintaining module may also be configured to maintain an index search table, wherein a plurality of components may be divided into a plurality of groups, components included in each group being collectively identified by a symbol, the symbol corresponding to each group in an index search table being stored at least in association with an index of one logical unit, and an index of one logical unit indicating a boundary of a range of a logical unit that a component included in a group corresponding to that index is backed up.

In one embodiment, backup module 410 may be further configured to perform backup through at least one of the following: periodically backing up one or more components in a plurality of components; backing up, before at least one component of a plurality of components is upgraded, at least one component; and backing up, before configuration of at least one component in a plurality of components may be changed, a configuration of at least one component. In one embodiment, each module and sub-module may be replaced by a single module that may be configured to achieve the tasks of each individual module.

Specific functions and operations of the apparatus 400 correspond to a component retrieving method 200 and failure recovering method 300 according to various embodiments of the present disclosure as described with reference to FIGS. 2 and 3, which, therefore, will not be detailed for purpose of brevity.

Those skilled in the art should be aware that any structural diagram described here indicates an illustrative principle diagram for implementing the principle of the present invention. Similarly, it should be understood that flowcharts described herein may be specifically embodied in a computer readable medium, and various procedures are performed by a computer or processor, regardless of whether such computer or processor is explicitly illustrated.

Those skilled in the art should also be aware that various steps of the above methods may be performed through a programmed computer. Here, some embodiments also intend to cover a program storage device, e.g., a machine-readable or computer-readable digital data storage medium including an instruction program that is executable by an encoding machine or a computer, wherein the instruction program executes some or all of the steps of the above methods. A program storage device may be, e.g., a digital memory, a magnetic storage medium, such as a magnetic disk, a magnetic tape, a hard disk drive or optical readable digital data storage medium. The present embodiment also intends to cover a computer programmed to perform the steps of the above method.

Those skilled in the art should also be aware that various steps of methods 200 and 300 may be implemented by any apparatus, device or machine that include a "processor" or "controller" but are not shown in the figures, e.g., a host server. Various functions of the processor or controller may be provided through dedicated hardware and hardware capable of executing software in association with appropriate software. When being provided by the processor, these functions may be provided by a single dedicated processor, a single shared processor, or a plurality of independent processors, wherein some independent processors may be shared. In addition, the term "processor" or "controller"

explicitly used herein should not be construed as exclusively referring to hardware capable of executing software, which may implicitly include, but not limited to, digital signal processor (DSP) hardware, network processor, application-specific integrated circuit (ASIC), field programmable gate array (FPGA), read-only memory (ROM) for storing software, a random access memory (RAM), and a non-volatile memory. It may also comprise conventional and/or customized other hardware.

The description above is only provided illustratively for illustrating the present disclosure. Those skilled in the art would appreciate that different structures may be provided based on the principle of the present disclosure described above. Although these different structures are not explicitly described or illustrated herein, they all embody the principle of the present disclosure and are included in its spirit and scope. In addition, all examples mentioned herein are mainly used for teaching purposes so as to help readers to understand the principle of the present disclosure and the idea contributed by the inventor for advancing the field, which should not be interpreted as a limitation to the scope of the present invention. In addition, all statements regarding the principle, aspects and embodiments of the present disclosure and their specific examples include their equivalents.

What is claimed is:

1. A method for failure recovery in a storage device comprising at least one server and a storage unit with a plurality of components running on the at least one server, the method comprising:
    backing up, in a storage unit, one or more components in a plurality of components running on at least one server;
    monitoring occurrence of a failure on the at least one server,
    locating one or more components causing a failure;
    obtaining one or more components that are backed up in the storage unit and correspond to the one or more components causing the failure;
    recovering from the failure using the obtained one or more components;
    establishing a plurality of logical units in the storage unit, each logical unit including a storage area having an address range and each component backed up being stored in a corresponding logical unit;
    maintaining a logical unit search table, wherein a name of each component in the plurality of components, an index of the logical unit in which the component is backed up, and an initial address of the storage area on which the component is backed up are stored, wherein the plurality of components comprises at least one of: an operating system kernel, a driver, a software configuration file, a changeable software binary file, and firmware; and
    maintaining an index search table, wherein the plurality of components are divided into a plurality of groups, wherein each group has one or more component, the one or more components included in each group being collectively identified by a symbol corresponding to each group, the symbol corresponding to each group being stored at least in association with the index of a first logical unit, wherein the index of the first logical unit indicates a boundary of a range of the logical unit in which a component included in the group corresponding to that index is backed up.

2. The method according to claim 1, wherein obtaining one or more components that correspond to the one or more components causing the failure further comprises:
    for each component of the one or more components causing the failure:
        looking up a range of the logical unit corresponding to the component based on the index search table;
        looking up a name of the component and an initial address of the storage area corresponding thereto within the range of the logical unit in the logical unit search table; and
        obtaining a component that corresponds to the component and is backed up in the storage unit based on the initial address of the storage area.

3. The method according to claim 2, wherein the logical unit search table and the index search table are maintained in a non-volatile memory.

4. The method according to claim 2, wherein the name of each component in the plurality of components includes a timestamp when the component is established.

5. The method according to claim 4, wherein obtaining a component that is backed up in the storage unit comprises obtaining the component having a latest timestamp.

6. The method according to claim 2, wherein the plurality of components are divided into a plurality of groups according to an initial letter of each component, and each component included in each group are collectively identified by the initial letter of each component.

7. The method according to claim 1, wherein backing up, in a storage unit, one or more components in a plurality of components running on at least one server comprises at least one of:
    periodically backing up the one or more components in the plurality of components;
    backing up, before at least one component of the plurality of components is upgraded, the at least one component; and
    backing up, before configuration of at least one component in the plurality of components is changed, the configuration of the at least one component; and
    wherein the method further comprises updating the logical unit search table and the index search table based on the backup.

8. An apparatus for failure recovery in a storage device that comprises at least one server and a storage unit with a plurality of components running on the at least one server, the apparatus for failure recovery configured to:
    back up, in a storage unit using one or more processors and memory, one or more components in a plurality of components running on at least one server;
    monitor occurrence of a failure on the at least one server,
    locate one or more components causing the failure;
    obtain one or more components that are backed up in the storage unit and correspond to the one or more components causing the failure;
    recover from the failure using the obtained one or more components;
    the apparatus comprising a logical unit establishing module configured to establish a plurality of logical units in the storage unit, each logical unit including a storage area having a certain address range, and each component backed up being stored in a corresponding logical unit; and
    a search table maintaining module configured to maintain a logical unit search table, wherein a name of each component in the plurality of components, an index of the logical unit in which the component is backed up, and an initial address of the storage area on which the component is backed up are stored, wherein the plurality of components comprises at least one of: an operating system kernel, a driver, a software configuration file, a changeable software binary file, and firmware, and to maintain an index search table, wherein the plurality of components are divided into a plurality of groups, one or more components included in each group being collectively identified by a symbol corresponding to each group, the symbol corresponding to each group being stored at least in association with the index of a first logical unit, wherein the index of the first logical unit indicates a boundary of a range of the logical unit in which a component included in the group corresponding to that index is backed up.

9. The apparatus for failure recovery according to claim 8, wherein, for each component of the one or more components causing the failure:

look up a range of the logical unit corresponding to the component based on the index search table;

look up a name of the component and an initial address of the storage area corresponding thereto within the range of the logical unit in the logical unit search table; and obtain a component that corresponds to the component and is backed up in the storage unit based on the initial address of the storage area.

10. The apparatus for failure recovery according to claim 9, wherein the logical unit search table and the index search table is maintained in a non-volatile memory.

11. The apparatus for failure recovery according to claim 9, wherein the name of each component in the plurality of components includes a timestamp when the component is established.

12. The apparatus for failure recovery according to claim 11, further configured to obtain a component of the one or more components having a latest timestamp.

13. The apparatus for failure recovery according to claim 8, wherein the plurality of components are divided into a plurality of groups according to an initial letter of each component, and each component included in each group are collectively identified by the initial letter of each component.

14. The apparatus for failure recovery according to claim 8, further configured to perform the backup through at least one of:

periodically backing up the one or more components in the plurality of components;

backing up, before at least one component of the plurality of components is upgraded, the at least one component; and backing up, before configuration of at least one component in the plurality of components is changed, the configuration of the at least one component; and wherein the apparatus is further configured to update the logical unit search table and the index search table based on the backup.

15. A computer program product comprising:

a non-transitory computer readable medium encoded with computer executable program code, wherein the code enables execution across one or more processors for failure recovery in a storage device comprising at least one server and a storage unit with a plurality of components running on the at least one server, the method comprising:

backing up, in a storage unit, one or more components in a plurality of components running on at least one server;

monitoring occurrence of a failure on the at least one server, locating one or more components causing a failure;

obtaining one or more components that are backed up in the storage unit and correspond to the one or more components causing the failure;

recovering from the failure using the obtained one or more components establishing a plurality of logical units in the storage unit, each logical unit including a storage area having an address range and each component backed up being stored in a corresponding logical unit;

maintaining a logical unit search table, wherein a name of each component in the plurality of components, an index of the logical unit in which the component is backed up, and an initial address of the storage area on which the component is backed up are stored, wherein the plurality of components comprises at least one of: an operating system kernel, a driver, a software configuration file, a changeable software binary file, and firmware; and maintaining an index search table, wherein the plurality of components are divided into a plurality of groups, wherein each group has one or more components, the one or more components included in each group being collectively identified by a symbol corresponding to each group, the symbol corresponding to each group being stored at least in association with the index of a first logical unit, wherein the index of the first logical unit indicates a boundary of a range of the logical unit in which a component included in the group corresponding to that index is backed up.

\* \* \* \* \*